United States Patent
John et al.

(10) Patent No.: US 12,110,851 B2
(45) Date of Patent: Oct. 8, 2024

(54) FUEL INJECTOR IN AN ENGINE HAVING SPRAY ORIFICE SET CONFIGURED FOR OFFSET POSITIONING AND ENGINE OPERATING METHOD

(71) Applicant: Caterpillar Inc., Peoria, IL (US)

(72) Inventors: Bobby John, Peoria, IL (US); Jonathan W. Anders, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 119 days.

(21) Appl. No.: 18/082,101

(22) Filed: Dec. 15, 2022

(65) Prior Publication Data

US 2024/0200520 A1 Jun. 20, 2024

(51) Int. Cl.
*F02M 43/04* (2006.01)
*F02M 51/06* (2006.01)

(52) U.S. Cl.
CPC ............ *F02M 43/04* (2013.01); *F02M 51/06* (2013.01); *F02M 2200/46* (2013.01)

(58) Field of Classification Search
CPC ........ F02F 3/28; F02M 43/04; F02M 2200/46
See application file for complete search history.

(56) References Cited

U.S. PATENT DOCUMENTS

| | | | | |
|---|---|---|---|---|
| 5,996,558 | A * | 12/1999 | Ouellette | F02D 19/0689 123/506 |
| 8,800,529 | B2 * | 8/2014 | Wickstone | F02M 61/182 123/304 |
| 9,175,651 | B2 * | 11/2015 | Kim | F02D 19/0694 |
| 9,376,992 | B2 * | 6/2016 | Brown | F02M 21/0263 |
| 2020/0063704 | A1 * | 2/2020 | Anders | F02D 41/3011 |

FOREIGN PATENT DOCUMENTS

| | | | | |
|---|---|---|---|---|
| EP | 1275840 | A2 | 1/2003 | |
| EP | 3743615 | | 12/2020 | |
| EP | 3743615 | B1 * | 1/2023 | F02B 23/0663 |

OTHER PUBLICATIONS

Written Opinion and International Search Report for Int'l. Patent Appln. No. PCT/US2023/080446, mailed Mar. 22, 2024 (12 pgs).

* cited by examiner

*Primary Examiner* — Sizo B Vilakazi
(74) *Attorney, Agent, or Firm* — Brannon Sowers & Cracraft PC

(57) ABSTRACT

An engine includes a piston movable in a cylinder and having a combustion bowl, and an annular rim forming a scoop extending axisymmetrically around a piston center axis. A fuel injector tip extends into the cylinder and includes a first orifice set and a second orifice set offset from one another and offset from the piston center axis. A plurality of orifice-rim distances are defined between orifices in the second orifice set and an annular rim of the piston. The orifices in the second orifice set having a range of orifice sizes varied in direct relation to the respective orifice-rim distances. Related methodology is also disclosed.

20 Claims, 2 Drawing Sheets

FUEL INJECTOR IN AN ENGINE HAVING SPRAY ORIFICE SET CONFIGURED FOR OFFSET POSITIONING AND ENGINE OPERATING METHOD

TECHNICAL FIELD

The present disclosure relates generally to an internal combustion engine having multiple spray orifice sets in a fuel injector, and more particularly to orifices in an orifice set in a fuel injector having a range of orifice sizes that is varied in direct relation to a distance to a piston rim.

BACKGROUND

Internal combustion engines are widely used worldwide for vehicle propulsion, electric power generation, handling of liquids and gases, and in a great many industrial applications. Fuel and air is combusted within an engine cylinder to produce a rapid rise in pressure and temperature that drives a piston coupled to a crankshaft. Spark-ignited engines typically employ a liquid petroleum distillate fuel such as gasoline, or a gaseous fuel such as natural gas, methane, propane, various blends, and even gaseous hydrogen in some applications. Compression-ignition engines utilize fuels such as diesel distillate fuel, biodiesel, and others that can be autoignited with air in a compression stroke of a piston. Research investments in recent years have increasingly focused on flexibility of engines respecting fuel utilization, especially gaseous fuels.

Fuel prices tend to be dynamic, and gaseous fuels can have combustion or emissions characteristics it is desirable to exploit. Certain engine platforms allow for operation on either or both of a liquid fuel and a gaseous fuel. Diesel fuel alone tends to be relatively easy to autoignite but can have certain undesirable emissions. Gaseous fuels, on the other hand, may have desirable emissions profiles but can exhibit ignition problems such as ignition failure or knock, or suffer from problems of combustion stability. In so-called lean-burn applications where gaseous fuel and air are burned at stoichiometrically lean equivalence ratios, such challenges can be especially acute.

Dual fuel engines can employ a combustion-initiating pilot injection of liquid fuel to ignite a main charge of gaseous fuel and address some of these issues with combustion predictability and controllability. Dual fuel engines may also employ a sparkplug to ignite a gaseous fuel where use of diesel is undesired or unavailable. Engineers continue to seek improved strategies for combustion phasing control and other purposes in dual fuel and other engines, including expanded capabilities for operation in so-called diesel-only mode. One example dual fuel engine is set forth in European Patent No. 1275840A2 to Coldren.

SUMMARY

In one aspect, an engine includes an engine housing having a cylinder formed therein, and a piston movable in the cylinder and including a combustion bowl, and an annular rim extending circumferentially around the combustion bowl and defining a piston center axis. The engine further includes a fuel injector tip having a first orifice set including a plurality of orifices arranged in a first targeting pattern within the cylinder and distributed around a first tip axis, and a second orifice set including a plurality of orifices arranged in a second targeting pattern and distributed around a second tip axis. The second tip axis is offset from the piston center axis, such that a plurality of orifice-rim distances are defined, in a projection plane normal to the piston center axis, between the plurality of orifices in the second orifice set and the annular rim. The plurality of orifices in the second orifice set have a range of orifice sizes that is varied in direct relation to the respective orifice-rim distances.

In another aspect, a method of operating an engine includes moving a piston defining a piston center axis toward a top-dead-center position in a cylinder in an engine, and injecting a first shot of a liquid fuel into the cylinder from a secondary orifice set, in a fuel injector tip, offset from the piston center axis. The method further includes advancing spray jets of the first shot through the cylinder according to a targeting pattern that is based on an arrangement of the secondary orifice set in the fuel injector tip, and according to a penetration pattern that is based on a varied size of orifices in the secondary orifice set. The method still further includes injecting a second shot of a liquid fuel into the cylinder from a main orifice set, in the fuel injector tip, and advancing spray jets of the second shot through the cylinder. The method still further includes compression-igniting the liquid fuel of the first shot and the second shot in the cylinder.

In still another aspect, a fuel injector includes a nozzle having an injector tip with a main tip portion and a secondary tip portion, a main orifice set formed in the main tip portion, and a secondary orifice set formed in the secondary tip portion. The nozzle further has formed therein at least one liquid fuel supply passage extending to the main orifice set and to the secondary orifice set. The main tip portion defines a first tip axis, and the secondary tip portion defines a second tip axis that is offset from the first tip axis. The main orifice set includes a plurality of orifices arranged in a first targeting pattern around the first tip axis, and the secondary orifice set includes a plurality of orifices arranged in a second targeting pattern around the second tip axis. The plurality of orifices in the secondary orifice set have a range of spray angles, and a range of orifice sizes that varies in direct relation to the respective spray angles.

DETAILED DESCRIPTION

Figure 1:
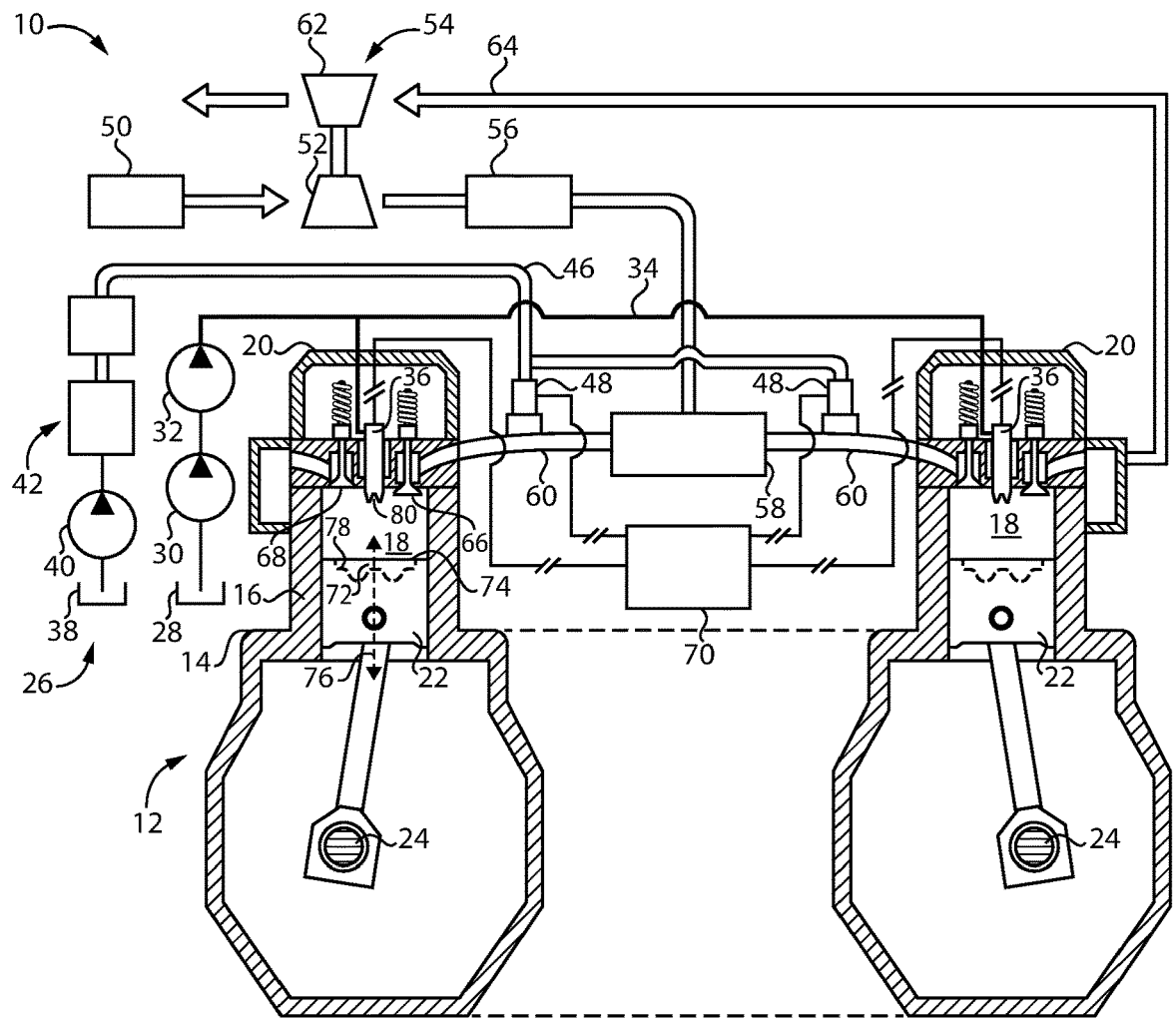
FIG. 1 is a diagrammatic view of an internal combustion engine system, according to one embodiment.

Referring to FIG. 1, there is shown an internal combustion engine system 10, according to one embodiment. Engine system 10 includes an internal combustion engine 12 having an engine housing 14 including a cylinder block 16 and an engine head 20 attached to cylinder block 16. Cylinder block 16 has a plurality of combustion cylinders 18 formed therein. In the illustrated embodiment two cylinders 18 are shown and may be configured substantially identically to one another, thus description and discussion herein of cylinder 18 or associated components in the singular will be understood to refer by way of analogy to any of the cylinders in engine 12 and associated components. Engine 12 may include any number of cylinders in any suitable arrangement such as an in-line pattern, a V-pattern, or still another. A plurality of pistons 22 are each movable in one of cylinders 18 and may be configured cooperatively with a fuel injector as further discussed herein.

Engine system 10 further includes a fuel system 26 having a liquid fuel supply 28, a low-pressure pump 30, a high-pressure pump 32, and a common rail 34 or other pressurized fuel reservoir that contains pressurized liquid fuel for delivering to a plurality of direct fuel injectors 36. Each fuel injector 36 may be positioned to extend partially into one of cylinders 16. As further discussed herein, fuel injectors 36 may be uniquely configured for improved controllability of a heat release rate and combustion phasing during combustion. Liquid fuel supply 28 can include any suitable compression-ignition liquid fuel, such as a liquid diesel distillate fuel, a higher octane fuel with a cetane enhancer, or still another. Rather than a common rail implementation, fuel system 26 could include so-called unit pumps, each configured with a fuel pressurization plunger that is hydraulically actuated or cam-actuated, for example.

Fuel system 26 also includes a gaseous fuel supply 38. Gaseous fuel supply 38 may contain or receive a feed of any suitable gaseous fuel such as natural gas, methane, ethane, biogas, various blends of these including hydrogen blends, and still others. A transfer pump 40 is fluidly connected to gaseous fuel supply 38 and conveys a gaseous fuel in cryogenically stored liquified form to vaporization and pressurization equipment 42. Vaporized and pressurized gaseous fuel may then be conveyed to a gaseous fuel conduit extending to a plurality of gaseous fuel admission valves 48. Any manner of providing a gaseous fuel, including pressurized gaseous fuel stored or received in a gaseous form or cryogenically stored liquified gaseous fuel such as liquified natural gas (LNG) might be used.

Engine system 10 also includes a fresh air inlet 50 configured to receive ambient air for conveying to engine 12 by way of a compressor 52 in a turbocharger 54. The compressed air may be fed by way of an aftercooler 56 to an intake manifold 58, and thenceforth to a plurality of intake runners 60 each extending to one of cylinders 18. In the illustrated embodiment gaseous fuel admission valves 48 fluidly connect to intake runners 60. In other embodiments a gaseous fuel could be delivered by fumigation into turbocharger 54, port injected, manifold injected, or direct injected into cylinders 16. Exhaust from combustion in cylinders 16 is conveyed by way of an exhaust conduit 64 to a turbine 62 in turbocharger 54. Aftertreatment apparatus (not shown) can be positioned to receive exhaust from turbine 62. A plurality of intake valves 66 and a plurality of exhaust valves 68 may be supported in engine head 20 and operated according to any suitable strategy including conventional four-cycle operation, or a variable valve timing strategy such as so-called late intake valve closing. An electronic control module or ECM 70 is in control communication with fuel injectors 36, with fuel admission valves 48, and potentially with other electronically controlled or electronically monitored components in engine system 10.

Figure 2:
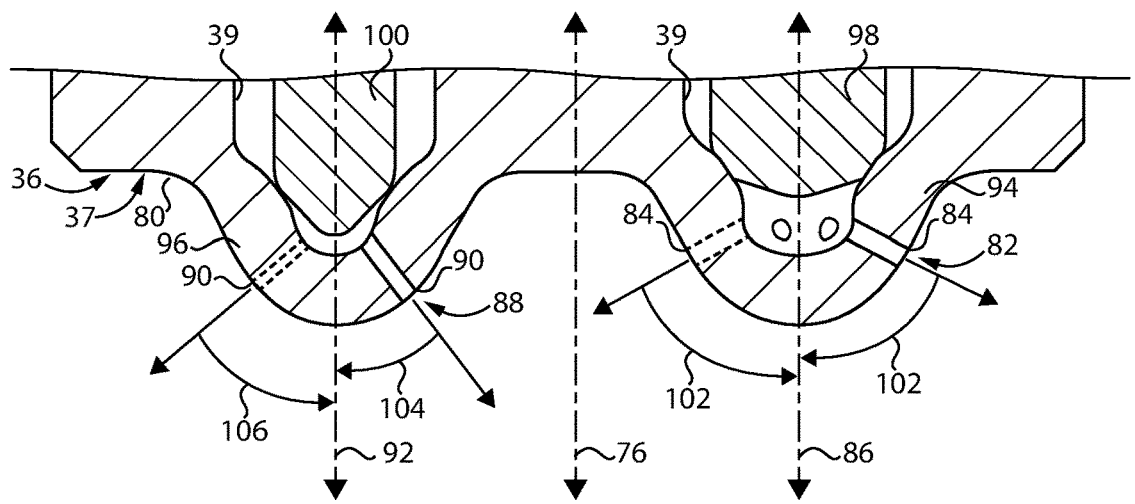
FIG. 2 is a sectioned side diagrammatic view of a fuel injector nozzle, according to one embodiment.

Each piston 22, hereinafter referred to in the singular, is movable in the respective cylinder 18 and includes a combustion bowl 72, and an annular rim 74 extending circumferentially around combustion bowl 72 and defining a piston center axis 76. Referring also now to FIG. 2, each fuel injector 36, shown in FIG. 2 and also referred to hereinafter in the singular, includes a nozzle 37 having a fuel injector tip 80 extending into cylinder 18. Fuel injector tip 80, referred to herein, at times, interchangeably with nozzle 37, includes a first orifice set 82 having a plurality of orifices 84 arranged in a first targeting pattern within cylinder 18 and distributed around a first tip axis 86. Fuel injector tip 80 further includes a second orifice set 88 having a plurality of orifices 90 arranged in a second targeting pattern different from the first targeting pattern and distributed around a second tip axis 92. First orifice set 82 may include a main orifice set, such as may be used to inject a second shot or main shot of a liquid fuel in an engine cycle. Second orifice set 88 may include a secondary orifice set configured to inject a first shot or early shot of the liquid fuel at an earlier time in an engine cycle. The terms "first," "second," "main," "secondary," and like terms are used herein for descriptive convenience and do not require or imply any particular structure, size, or ordering of operations. Typically the "main" orifice set 82 will be larger in size than the "secondary" orifice set 88 and provides a larger size injection of fuel, although the present disclosure is not thereby limited.

In one implementation, the first or early shot is smaller and can be injected about 60° before a top-dead-center position of piston 18, and the second or main shot is larger and can be injected at or just a few degrees prior to the top-dead-center position of piston 22 in an engine cycle. In some embodiments a first and second shot could be injected at the same time using both first orifice set 82 and second orifice set 88, such as at a top-dead-center position of piston 22 in a diesel-only mode. In a typical scenario, however, diesel-only mode includes a first shot per engine cycle using second orifice set 88, and a subsequent, larger shot using first orifice set 82. In a dual fuel mode typically second orifice set 88 will be used to inject an early pilot shot and also used to subsequently inject a later, larger main shot at approximately top-dead-center. Combustion of the liquid fuel injected in the dual fuel mode triggers ignition of a larger, main charge of a gaseous fuel.

A targeting pattern as discussed herein refers to a pattern through space defined by orifices in the respective first orifice set 82 and second orifice set 88. The first targeting pattern may differ from the second targeting pattern according to at least one of a varied spray angle, different between the respective orifice sets, or a varied orifice-orifice spacing within the respective orifice sets. As further discussed herein, the first targeting pattern may include a wider spray angle 102, and the second targeting pattern may include at least one narrower spray angle 104 and 106. A number of orifices in first orifice set 82 may be from 5 to 7, typically a total of 6, and a number of orifices in second orifice set 88 may include 3 to 5, typically a total of 4.

Fuel injector tip 80 may further include a first or main tip portion 94 having first orifice set 82 formed therein, and a second or secondary tip portion 96 having second orifice set 88 formed therein. Fuel injector 36 may also include a first check 98 and a second check 100 movable within fuel injector tip 80 and structured to open and close first orifice set 82 and second orifice set 88. Checks 98 and 100 may be electrically actuated, such as pilot operated via a solenoid operated pilot valve. Common rail 34 may feed liquid fuel by way of a plurality of liquid fuel supply conduits (not numbered) to each respective fuel injector 36, such that liquid fuel at the same pressure can be simultaneously supplied to each of first tip portion 94 and second tip portion 96. Fuel injector 36 includes at least one liquid fuel supply passage 39 extending to first orifice set 82 and second orifice set 88.

Figure 3:
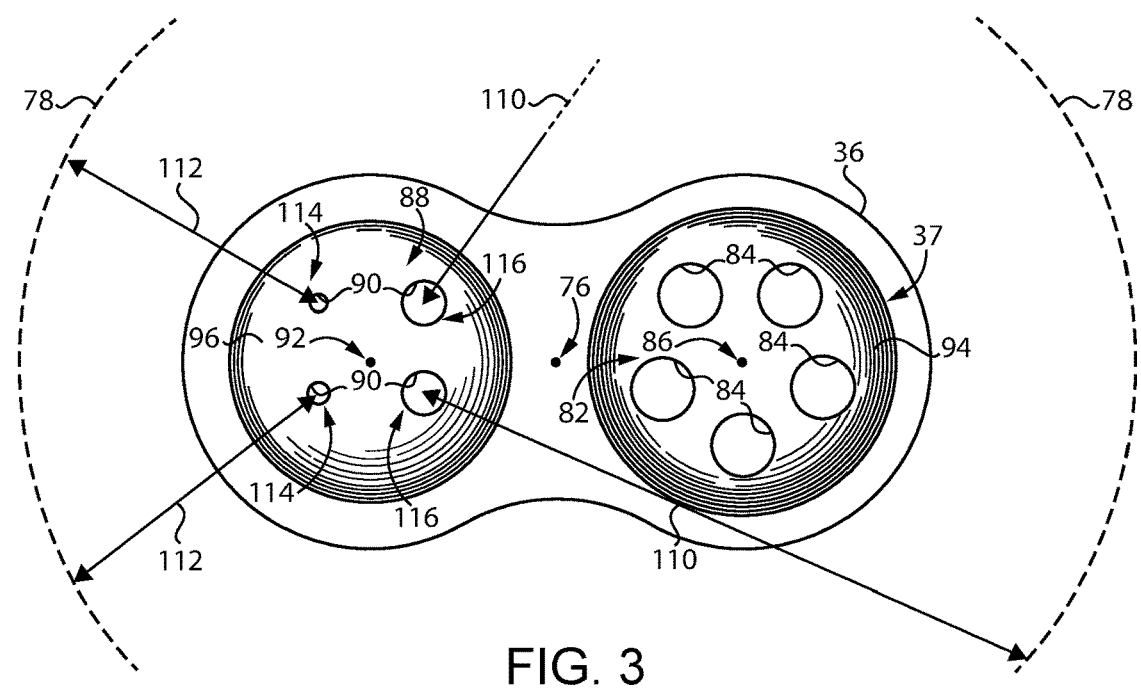
FIG. 3 is a diagrammatic end view of a fuel injector tip, according to one embodiment.

Turning also now to FIG. 3, there is shown fuel injector 36 including nozzle 37 in relation to a diagrammatic illustration of scoop 78. Fuel injector 36 and fuel injector tip 80 can be understood to define a fuel injector center axis that will typically be colinear with piston center axis 76 when fuel injector 36 is installed for service in engine head 20. Thus, the fuel injector center axis is shown with numeral 76 in FIG. 3. Main tip portion 94 defines first tip axis 86, and secondary tip portion 96 defines second tip axis 92. Second tip axis 92 is offset from first tip axis 86 and offset from piston center axis and fuel injector center axis 76, such that a plurality of different orifice-rim distances 110 and 112 are defined, in a projection plane normal to axis 76, between orifices 90 in second orifice set 88 and annular rim 74. Second orifice set 88 can include smaller orifices 114 at radially outward locations relative to axis 76, and larger orifices 116 at radially inward locations relative to axis 76.

From the illustration and accompanying description, it will be understood that offsetting secondary tip portion 96 and orifices 90 in second orifice set 88 positions orifices 90 at different distances from annular piston rim 74, in particular different distances from scoop 78. Based upon the different distances separating orifices 90 from scoop 78 when a shot of fuel is injected the individual spray jets of fuel have different distances to travel to reach scoop 78 depending upon angular orientation about second tip axis 92. Absent the present disclosure, and utilizing orifices that are uniform in size and arrangement, individual spray jets of an injected shot of fuel at a given injection pressure could be expected to reach or approach scoop 78 at different times, with some of the spray jets therefore failing to enter scoop 78, enter scoop 78 too soon, or enter scoop 78 too late, in an engine cycle. It is generally desirable for combustion or pre-combustion of an earlier shot to occur relatively uniformly within scoop 78. According to the present disclosure, spray jets from second orifice set 88 can be expected to reach scoop 78 at approximately the same time.

To this end, the plurality of orifices 90 in second orifice set 88 have a range of orifice sizes that is varied in direct relation to the respective orifice-rim distances 110 and 112. Accordingly, larger orifices 116 are associated with larger orifice-rim distance 110. Smaller orifices 114 are associated with smaller orifice-rim distance 112. The larger size of larger orifices 116 as compared to smaller orifices 114 can assist in greater momentum of spray jets and thus faster and greater penetration into cylinder 18 that compensates for the larger orifice-rim distances 110. In the illustrated embodiment, spray orifices 84 in main orifice set 82 have a uniform size and a uniform spray angle. Orifices 90 may have a total of two different sizes and a total of two different spray angles, spray angles 104 and 106 as depicted in FIG. 2. The narrower spray angle 106 as compared to spray angle 104 can assist in targeting the respective spray jets toward scoop 78 in consideration of the shorter orifice-rim distance 112 and lesser jet penetration from smaller orifices 114. Spray angle 102 may be larger than spray angles 104 and 106. The plurality of orifices 90 in second spray orifice set 88 may have a range of spray angles (the at least one narrower spray angle) that varies in direct relation to the respective orifice-rim distances. In various extensions more than two different spray angles in a secondary orifice set might be used. Analogously, more than two different sizes in a secondary orifice set might be used. Each individual orifice could thus be tuned to a spray angle, size, orifice-orifice spacing, and potentially even exit orientation that is based on its respective orifice-rim distance. Typically, the plurality of orifices 90 in second orifice set 88 has a range of orifices sizes that varies in direct relation to the respective spray angles.

Figure 4:
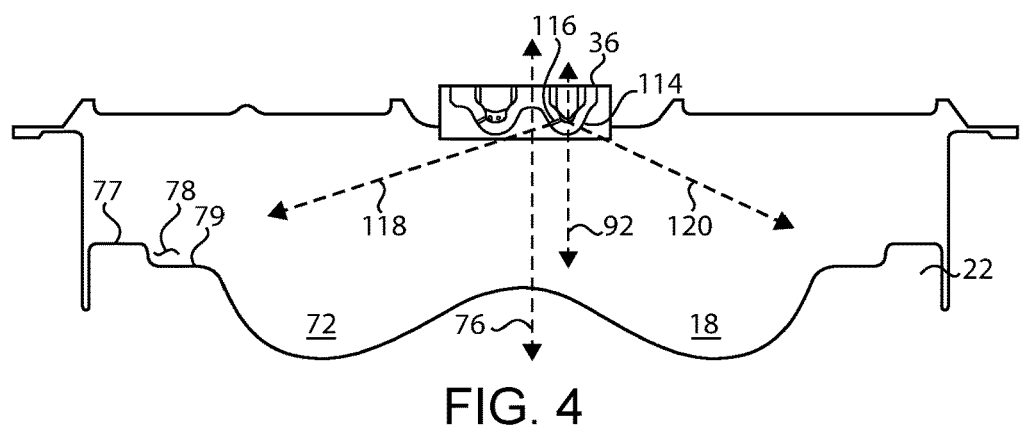
FIG. 4 is a diagrammatic view of a fuel injector and piston in a cylinder showing spray jets of injected fuel, according to one embodiment.

Referring also now to FIG. 4, there can be seen piston 22 including an outer rim surface 77, and an inner rim surface 79 forming scoop 78. The illustration in FIG. 4 is flipped left-right relative to the FIG. 3 illustration. Outer rim surface 77, inner rim surface 79, and scoop 78 may each extend axisymmetrically around piston center axis 76 and around combustion bowl 72. In FIG. 4 piston 22 is shown as it might appear at about 60° before a top-dead-center position in an engine cycle. Spray jets 118 and 120 of a first shot have been advanced from larger orifices 116 and smaller orifices 114, respectively. Spray jet 120 may be injected at a spray angle 106 that is narrower than spray angle 104 of spray jet 118. Spray jets 118 and 120 may both target scoop 78, thus the second targeting pattern discussed herein may include a scoop-targeting pattern into scoop 78 when piston 22 is between a bottom-dead-center position and a top-dead-center position. The second targeting pattern may include a bowl-targeting pattern into combustion bowl 72 when piston 22 is at the top-dead-center position.

Figure 5:
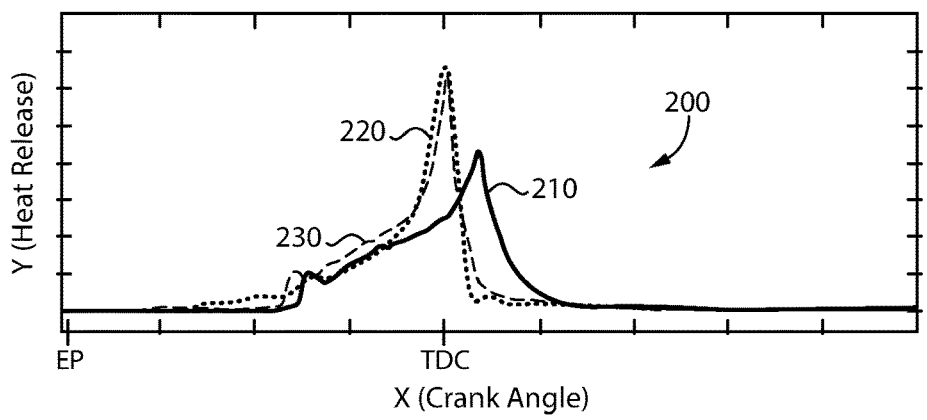
FIG. 5 is a graph showing heat release in a combustion cycle according to different fuel injector configurations.

From the state depicted in FIG. 4, piston 22 can move upwardly toward its top-dead-center position, at which point in time a main shot of liquid fuel can be injected by way of first orifice set 82. At or closer to top-dead-center the liquid fuel of the early shot and the main shot compression-ignites. Turning also now to FIG. 5, there is shown a graph 200 illustrating heat release rates for different scenarios, where "EP" designates an early pilot or first shot of liquid fuel, and a main shot of liquid fuel is injected at or close to "TDC". A trace 210 illustrates a heat release that might be expected utilizing a dual outlet check as discussed here but having secondary orifices of uniform size and spray angle. Thus, trace 210 shows what might be expected if a first shot of liquid fuel is injected using a fuel injector with a secondary orifice set offset from a piston center axis and having uniform size and uniform spray angle. Another trace 220 shows a target or optimum heat release that is highest amplitude approximately at TDC. A third heat release trace 230 illustrates what might be expected according to the present disclosure. It can thus be seen from FIG. 5 that the present disclosure approximates an optimum heat release rate, and that an approach as in trace 210 can be expected to be retarded in heat release past the TDC position.

INDUSTRIAL APPLICABILITY

Referring to the drawings generally, operating engine system 10 can include moving piston 22 toward a top-dead-center position in cylinder 18. After passing a bottom-dead-center position, but prior to reaching the top-dead-center position, fuel injector 36 can be operated to inject a first shot of a liquid fuel into cylinder 18 from secondary orifice set 88. Spray jets of the first shot may be advanced through cylinder 18 according to a targeting pattern that is based on an arrangement of secondary orifice set 88 in fuel injector tip 80. Advancing of the spray jets of the first shot may also occur according to a penetration pattern that is based on a varied size of orifices in secondary orifice set 88. Thus, according to the present disclosure spray jets from larger orifices may penetrate relatively faster than spray jets from comparatively smaller orifices.

At or close to the point in time at which piston 22 reaches a top-dead-center position a second shot of a liquid fuel may be injected into cylinder 18 from main orifice set 82. The spray jets of the second shot may be advanced through cylinder 18 and typically begin combusting upon or very shortly after exiting fuel injector tip 80. The liquid fuel of the first shot and the second shot is compression-ignited in cylinder 18.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An engine comprising:
an engine housing having a cylinder formed therein;
a piston movable in the cylinder and including a combustion bowl, and an annular rim extending circumferentially around the combustion bowl and defining a piston center axis;
a fuel injector tip including a first orifice set having a plurality of orifices arranged in a first targeting pattern within the cylinder and distributed around a first tip axis, and a second orifice set having a plurality of orifices arranged in a second targeting pattern and distributed around a second tip axis;
the second tip axis is offset from the piston center axis, such that a plurality of orifice-rim distances are defined, in a projection plane normal to the piston center axis, between the plurality of orifices in the second orifice set and the annular rim; and
the plurality of orifices in the second orifice set having a range of orifice sizes that is varied in direct relation to the respective orifice-rim distances.

2. The engine of claim 1 wherein the annular rim includes an outer rim surface, and an inner rim surface forming a scoop extending axisymmetrically around the piston center axis.

3. The engine of claim 2 wherein:
the piston is movable between a bottom-dead-center position and a top-dead-center position in the cylinder;
the first targeting pattern includes a bowl-targeting pattern into the combustion bowl when the piston is at the top-dead-center position; and
the second targeting pattern includes a scoop-targeting pattern into the scoop when the piston is between the bottom-dead-center position and the top-dead-center position.

4. The engine of claim 1 wherein the first targeting pattern includes a wider spray angle, and the second targeting pattern includes at least one narrower spray angle.

5. The engine of claim 4 wherein the at least one narrower spray angle includes a range of spray angles varied in direct relation to the respective orifice-rim distances.

6. The engine of claim 1 wherein the plurality of orifices in the second orifice set includes smaller orifices at radially outward locations relative to the piston center axis, and larger orifices at radially inward locations relative to the piston center axis.

7. The engine of claim 6 wherein a number of the orifices in the second orifice set is from 3 to 5.

8. The engine of claim 1 wherein the second tip axis is offset from the first tip axis, and further comprising a first check and a second check movable within the fuel injector tip and structured to open and close the first orifice set and the second orifice set, respectively.

9. The engine of claim 8 further comprising a pressurized liquid fuel supply, a liquid fuel supply conduit fluidly connecting the pressurized liquid fuel supply to the fuel injector tip, a gaseous fuel supply, and a gaseous fuel admission valve positioned fluidly between the gaseous fuel supply and the cylinder.

10. A method of operating an engine comprising:
moving a piston defining a piston center axis toward a top-dead-center position in a cylinder in an engine;
injecting a first shot of a liquid fuel into the cylinder from a secondary orifice set, in a fuel injector tip, offset from the piston center axis;
advancing spray jets of the first shot through the cylinder according to a targeting pattern that is based on an arrangement of the secondary orifice set in the fuel injector tip, and according to a penetration pattern that is based on a varied size of orifices in the secondary orifice set;
injecting a second shot of a liquid fuel into the cylinder from a main orifice set, in the fuel injector tip;
advancing spray jets of the second shot through the cylinder; and
compression igniting the liquid fuel of the first shot and the second shot in the cylinder.

11. The method of claim 10 wherein the advancing spray jets of the first shot includes advancing the spray jets toward a scoop formed in a rim of the piston, and the advancing spray jets of the second shot includes advancing the spray jets into a combustion bowl in the piston.

12. The method of claim 11 wherein the targeting pattern includes at least one of a varied spray angle or a varied spacing of a plurality of orifices in the secondary orifice set.

13. The method of claim 12 wherein the secondary orifice set includes smaller orifices at radially outward locations relative to the piston center axis, and larger orifices at radially inward locations relative to the piston center axis.

14. The method of claim 13 wherein the plurality of orifices in the secondary orifice set are arranged at a range of spray angles varied in direct relation to orifice-rim distances defined between each respective one of the plurality of orifices and the scoop.

15. The method of claim 14 wherein the injecting a first shot includes injecting the first shot through the secondary orifice set in a secondary tip portion of a fuel injector, and the injecting a second shot includes injecting the second shot through the main orifice set in a main tip portion of the fuel injector that is offset from the secondary tip portion.

16. The method of claim 10 wherein the injecting a first shot includes injecting a smaller quantity of the liquid fuel and the injecting a second shot includes injecting a larger quantity of the liquid fuel.

17. A fuel injector comprising:
a nozzle including an injector tip having a main tip portion and a secondary tip portion, a main orifice set formed in the main tip portion, and a secondary orifice set formed in the secondary tip portion;
the nozzle further having formed therein at least one liquid fuel supply passage extending to the main orifice set and to the secondary orifice set;
the main tip portion defining a first tip axis, and the secondary tip portion defining a second tip axis that is offset from the first tip axis;

the main orifice set including a plurality of orifices arranged in a first targeting pattern around the first tip axis, and the secondary orifice set including a plurality of orifices arranged in a second targeting pattern around the second tip axis;

the plurality of orifices in the secondary orifice set having a range of spray angles, and a range of orifice sizes that varies in direct relation to the respective spray angles.

18. The fuel injector of claim 17 wherein the first targeting pattern includes a wider spray angle, and the second targeting pattern includes at least one narrower spray angle.

19. The fuel injector of claim 17 wherein a fuel injector center axis is defined between the first tip axis and the second tip axis, and the plurality of spray orifices in the secondary orifice set includes smaller orifices at radially inward locations relative to the fuel injector center axis, and larger orifices at radially outward locations relative to the fuel injector center axis.

20. The fuel injector of claim 19 wherein the plurality of spray orifices in the main orifice set are from 5 to 7 in number and have a uniform size and a uniform spray angle, and the plurality of spray orifices in the secondary orifice set are from 3 to 5 in number and have a total of two different sizes and a total of two different spray angles.

* * * * *